(12) United States Patent
Somasundaram et al.

(10) Patent No.: US 8,331,290 B2
(45) Date of Patent: Dec. 11, 2012

(54) METHOD AND APPARATUS FOR DELIVERY NOTIFICATION OF NON-ACCESS STRATUM RETRANSMISSION

(75) Inventors: Shankar Somasundaram, Deer Park, NY (US); Rajat P. Mukherjee, Stanford, CA (US); Mohammed Sammour, Alrabieh (JO)

(73) Assignee: InterDigital Patent Holdings, Inc., Wilmington, DE (US)

( * ) Notice: Subject to any disclaimer, the term of this patent is extended or adjusted under 35 U.S.C. 154(b) by 429 days.

(21) Appl. No.: 12/473,587

(22) Filed: May 28, 2009

(65) Prior Publication Data

US 2010/0003982 A1 Jan. 7, 2010

Related U.S. Application Data

(60) Provisional application No. 61/057,394, filed on May 30, 2008.

(51) Int. Cl.
*H04Q 7/00* (2006.01)
*H04J 3/16* (2006.01)

(52) U.S. Cl. ...................................... 370/328
(58) Field of Classification Search .................. 370/328, 370/338, 331, 469
See application file for complete search history.

(56) References Cited

U.S. PATENT DOCUMENTS

| | | | |
|---|---|---|---|
| 2005/0175033 A1 | 8/2005 | Funnell et al. | |
| 2008/0026741 A1* | 1/2008 | Nakamata et al. | 455/420 |
| 2008/0285566 A1 | 11/2008 | Sammour et al. | |
| 2009/0061876 A1* | 3/2009 | Ho et al. | 455/436 |
| 2009/0103445 A1 | 4/2009 | Sammour et al. | |
| 2009/0103455 A1 | 4/2009 | Sammour et al. | |
| 2009/0219897 A1* | 9/2009 | Pajukoski et al. | 370/336 |
| 2010/0178923 A1* | 7/2010 | Yi et al. | 455/436 |
| 2010/0240367 A1* | 9/2010 | Lee et al. | 455/435.2 |
| 2010/0278051 A1* | 11/2010 | Larmo et al. | 370/242 |
| 2010/0330998 A1* | 12/2010 | Park et al. | 455/436 |
| 2011/0205906 A1* | 8/2011 | Yi et al. | 370/241 |

FOREIGN PATENT DOCUMENTS

| | | |
|---|---|---|
| EP | 1 868 311 | 12/2007 |
| EP | 1 919 114 | 5/2008 |
| WO | 02/17651 | 2/2002 |
| WO | 2007/078142 | 7/2007 |
| WO | WO2007/078142 | 7/2007 |

OTHER PUBLICATIONS

Third Generation Partnership Project, "Technical Specification Group Radio Access Network; Evolved Universal Terrestrial Radio Access (E-UTRA); Packet Data Convergence Protocol (PDCP) Specification (Release 8)", 3GPP TS 36.323, V8.1.0, (Mar. 2008).

(Continued)

*Primary Examiner* — Andrew Lee
(74) *Attorney, Agent, or Firm* — Volpe and Koenig, P.C.

(57) ABSTRACT

A method and apparatus for data delivery confirmation in a wireless transmit receive unit (WTRU) including transmitting an uplink (UL) message, performing a mobility operation, determining that the UL message is not acknowledged, and generating a delivery failure message. The mobility operation is a handover or a radio resource control (RRC) connection reestablishment. A message including the delivery failure message is passed between protocol layers.

10 Claims, 10 Drawing Sheets

OTHER PUBLICATIONS

Third Generation Partnership Project, "Technical Specification Group Radio Access Network; Evolved Universal Terrestrial Radio Access (E-UTRA) Radio Resource Control (RRC); Protocol Specification (Release 8)", 3GPP TS 36.331, V8.1.0, (Mar. 2008).

Third Generation Partnership Project, "Technical Specification Group Radio Access Network; Evolved Universal Terrestrial Radio Access (E-UTRA) Radio Resource Control (RRC); Protocol Specification (Release 8)", 3GPP TS 36.331, V8.5.0, (Mar. 2009).

CT1, Reply LS on Retransmission of UL and DL NAS Message During Inter-eNB Handovers, 3GPP TSG CT WG1 Meeting #53, C1-081863, (Cape Town, South Africa, May 5-9, 2008).

Qualcomm Europe, "Retransmission of NAS messages on the uplink during inter eNB Handover," 3GPP TSG CT WG1 Meeting #52, C1-081138 (Apr. 7-11, 2008).

Samsung, "Considerations on NAS message handling at handover," 3GPP TSG-RAN2 Meeting #58bis, R2-072512 (Jun. 25-29, 2007).

Third Generation Partnership Project, "Technical Specification Group Radio Access Network; Evolved Universal Terrestrial Radio Access (E-UTRA) And Evolved Universal Terrestrial Radio Access network (E-UTRAN); Overall Description; Stage 2 (Release 8)", 3GPP TS 36.300, V8.4.0, (Mar. 2008).

Third Generation Partnership Project, "Technical Specification Group Radio Access Network; Evolved Universal Terrestrial Radio Access (E-UTRA) And Evolved Universal Terrestrial Radio Access network (E-UTRAN); Overall Description; Stage 2 (Release 8)", 3GPP TS 36.300, V8.8.0, (Mar. 2009).

Third Generation Partnership Project, "Technical Specification Group Radio Access Network; Evolved Universal Terrestrial Radio Access (E-UTRA); Packet Data Convergence Protocol (PDCP) Specification (Release 8)", 3GPP TS 36.323, V8.1.0, (Mar. 2008).

Third Generation Partnership Project, "Technical Specification Group Radio Access Network; Evolved Universal Terrestrial Radio Access (E-UTRA); Packet Data Convergence Protocol (PDCP) Specification (Release 8)", 3GPP TS 36.323, V8.5.0, (Mar. 2009).

Third Generation Partnership Project, "Technical Specification Group Radio Access Network; Evolved Universal Terrestrial Radio Access (E-UTRA) Radio Resource Control (RRC); Protocol Specification (Release 8)", 3GPP TS 36.331 V8.1.0, (Mar. 2008).

Third Generation Partnership Project, "Technical Specification Group Radio Access Network; Evolved Universal Terrestrial Radio Access (E-UTRA) Radio Resource Control (RRC); Protocol Specification (Release 8)", 3GPP TS 36.331 V8.5.0, (Mar. 2009).

Third Generation Partnership Project, "Technical Specification Group Core Network and Terminals; Non-Access-Stratum (NAS) Protocol For Evolved Packet System (EPS); Stage 3 (Release 8)", 3GPP TS 24.301 V0.2.0, (Apr. 2008).

Third Generation Partnership Project, "Technical Specification Group Core Network and Terminals; Non-Access-Stratum (NAS) Protocol For Evolved Packet System (EPS); Stage 3 (Release 8)", 3GPP TS 24.301 V8.1.0, (Mar. 2009).

Third Generation Partnership Project, "Technical Specification Group Radio Access Network; Evolved Universal Terrestrial Radio Access (E-UTRA) Radio Link Control (RLC) Protocol Specification (Release 8)", 3GPP TS 36.322, V8.1.0, (Mar. 2008).

Third Generation Partnership Project, "Technical Specification Group Radio Access Network; Evolved Universal Terrestrial Radio Access (E-UTRA) Radio Link Control (RLC) Protocol Specification (Release 8)", 3GPP TS 36.322, V8.5.0, (Mar. 2009).

\* cited by examiner

METHOD AND APPARATUS FOR DELIVERY NOTIFICATION OF NON-ACCESS STRATUM RETRANSMISSION

CROSS REFERENCE TO RELATED APPLICATION

This application claims the benefit of U.S. Provisional Application No. 61/057,394 filed May 30, 2008, which is incorporated by reference as if fully set forth.

FIELD OF INVENTION

This application is related to wireless communications.

BACKGROUND

The Third Generation Partnership Project (3GPP) has initiated the Long Term Evolution (LTE) program to bring new technology, new network architecture, new configurations and new applications and services to wireless networks in order to provide improved spectral efficiency and faster user experiences. FIG. 1 shows an overview of an Evolved Universal Mobile Telecommunications System (UMTS) Terrestrial Radio Access Network (E-UTRAN) 100 in accordance with the prior art. As shown in FIG. 1, E-UTRAN 100 includes three eNodeBs (eNBs) 102, however, any number of eNBs may be included in E-UTRAN 100. The eNBs 102 are interconnected by an X2 interface 108. The eNBs 102 are also connected by an S1 interface 106 to the Evolved Packet Core (EPC) 104. The EPC 104 includes a Mobility Management Entity (MME) 108 and a Serving Gateway (S-GW) 110.

FIG. 2 shows an LTE user-plane protocol stack 200 in accordance with the prior art. The protocol stack 200 is located in a WTRU 210 and includes the packet data control protocol (PDCP) 202, the radio link control (RLC) 204, the medium access control (MAC) 206 and the physical layer (PHY) 208. The protocol stack 200 may also reside in an eNB (not shown).

FIG. 3 shows an LTE control plane protocol stack 300 in the WTRU 210 of FIG. 2. The control plane protocol stack 300 includes the non-access stratum (NAS) 302 and a radio resource control (RRC) 304. Also included are the PDCP 306, RLC 308 and MAC 310, which together form the layer 2 sublayer 312.

During a handover a WTRU 210 may transmit uplink (UL) system data units (SDUs) from the PDCP (206). If the WTRU 210 does not receive a notice that the SDUs were successfully delivered, the WTRU 210 may retransmit the SDUs. The WTRU 210 may use a PDCP status report, received from an eNB, to determine which uplink PDCP SDUs to retransmit. The WTRU 210 may also use the report to discard SDUs, if the SDUs were received or acknowledged by the status report.

During a handover, a target eNB may retransmit, to the WTRU 210, downlink PDCP SDUs that were forwarded by a source eNB. The WTRU 210 may transmit a PDCP status report to the target eNB. The target eNB may utilize the PDCP status report to determine which PDCP SDUs to retransmit to the WTRU 210. The target eNB may also discard downlink PDCP SDUs, if the SDUs were received or acknowledged by PDCP status report. Once the WTRU 210 receives the SDUs, the WTRU 210 may reorder the SDUs and eliminate duplicates. The WTRU 210 may then deactivate any functions based on a timer, such as a flush timer, for example. For signaling radio bearers (SRBs), the RLC 204 may indicate that handover has occurred and the PDCP 202 may reinitialize state variables such as a PDCP sequence number (SN) and a hyper frame number (HFN). The state variables may also be set to zero. All PDCP SDUs and PDCP PDUs that have been previously stored may be discarded.

In order to perform NAS level retransmission, the access stratum (AS) (not shown) may provide an indication of an NAS message transmission failure, if the failure occurred due to handover or cell selection.

SUMMARY

A method and apparatus is disclosed for data delivery confirmation in a wireless transmit receive unit (WTRU). This may include transmitting an uplink (UL) message, performing a mobility operation, determining that the UL message is not acknowledged, and generating a delivery failure message. The mobility operation may be a handover or a radio resource control (RRC) connection reestablishment. A message including the delivery failure message may be passed between protocol layers to a non-access stratum layer.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment. Furthermore, the terms "delivery notification", "delivery confirmation", "delivery indication", "transmission confirmation", and "transmission indication", are used interchangeably hereinafter.

As used herein, the terms "upper layer" and "lower layer" are relative terms. Each layer in a protocol stack, including the NAS, RRC, PDCP, RLC, and MAC, is an upper layer in relation to any layer below it in the protocol stack. Therefore, for example, the NAS would be an upper layer in relation to the RRC, PDCP, RLC and MAC layers whereas the RLC is only an upper layer in relation to the MAC layer.

Figure 4:
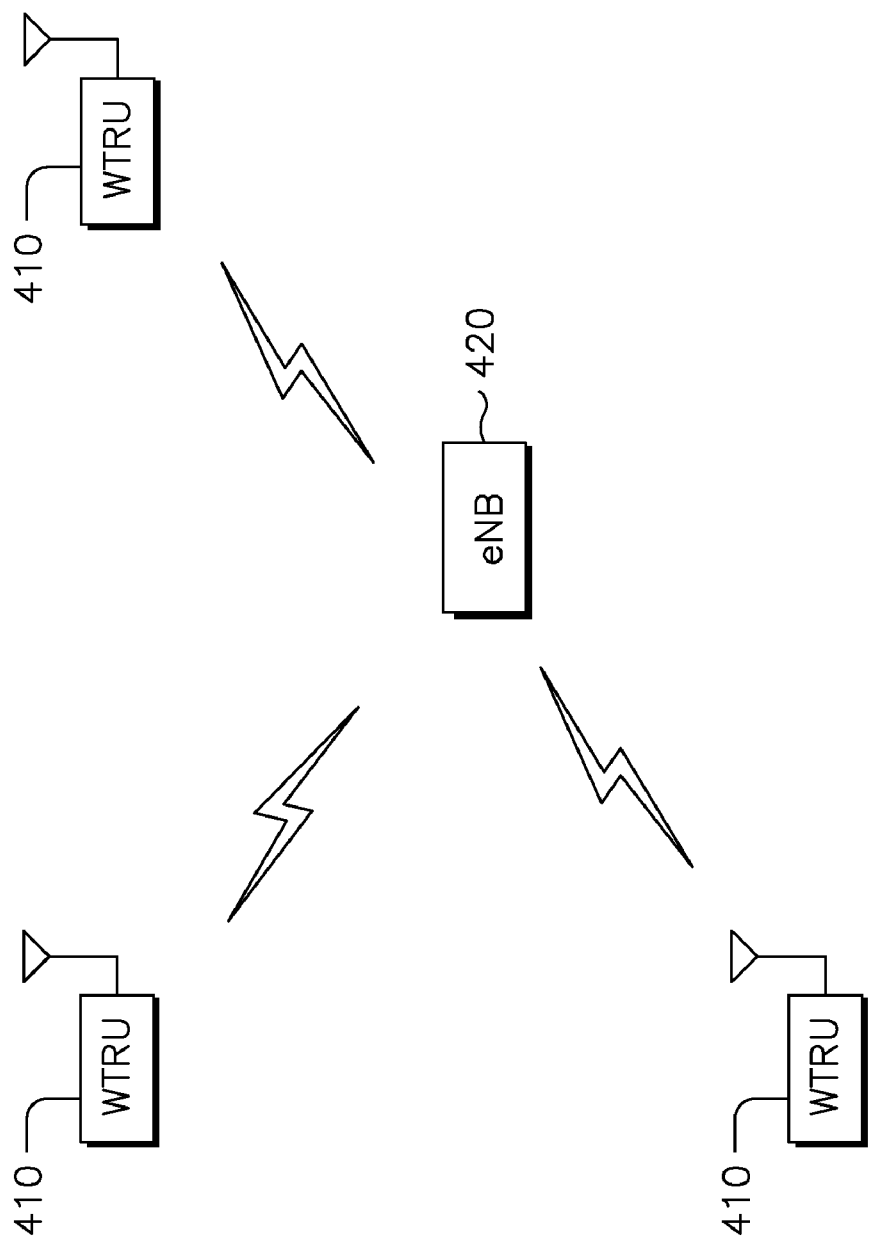
FIG. 4 shows an example wireless communication system including a plurality of WTRUs and an eNB in accordance with one embodiment.

FIG. 4 shows a wireless communication system 400 including a plurality of WTRUs 410 and an e Node B (eNB) 420. As shown in FIG. 4, the WTRUs 410 are in communication with the eNB 420. Although three WTRUs 410 and one eNB 420 are shown in FIG. 4, it should be noted that any combination of wireless and wired devices may be included in the wireless communication system 400.

Figure 1:
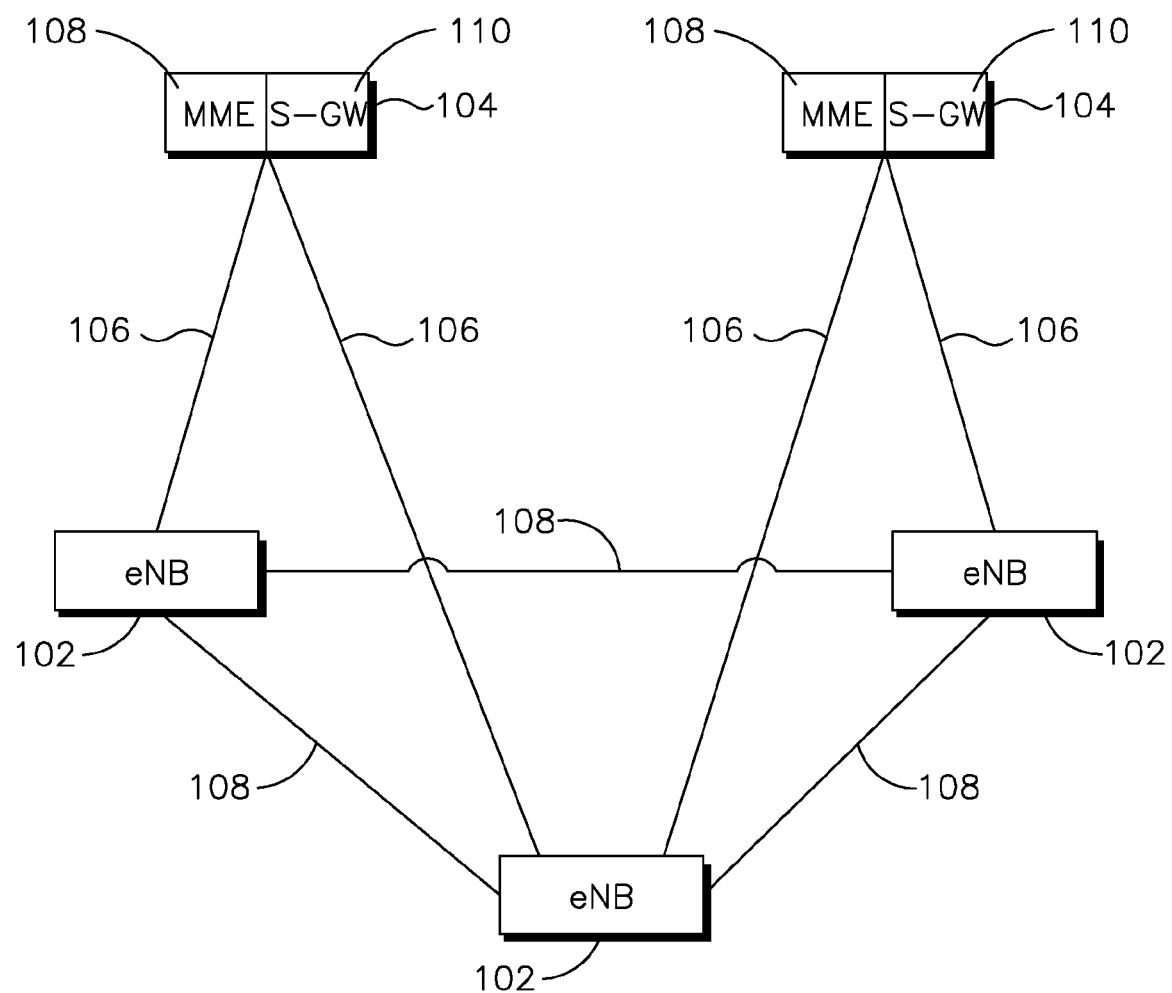
FIG. 1 shows an overview of an E-UTRAN in accordance with the prior art.
Figure 2:
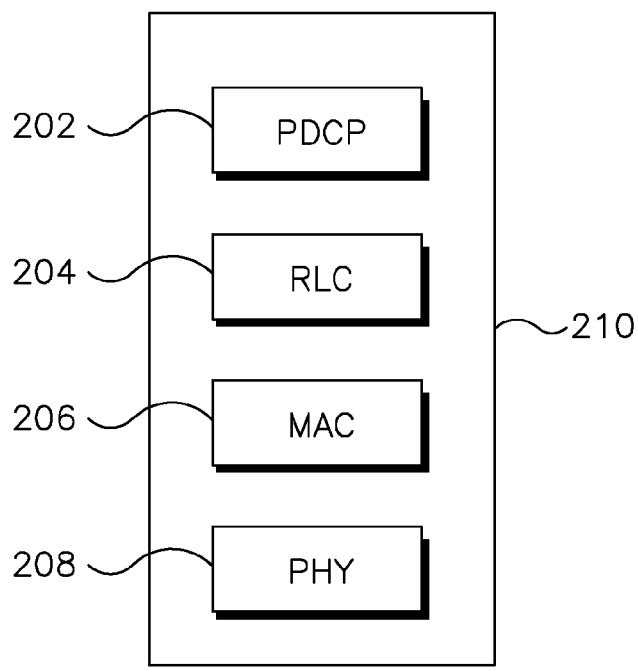
FIG. 2 shows an LTE user-plane protocol stack in accordance with the prior art.
Figure 3:
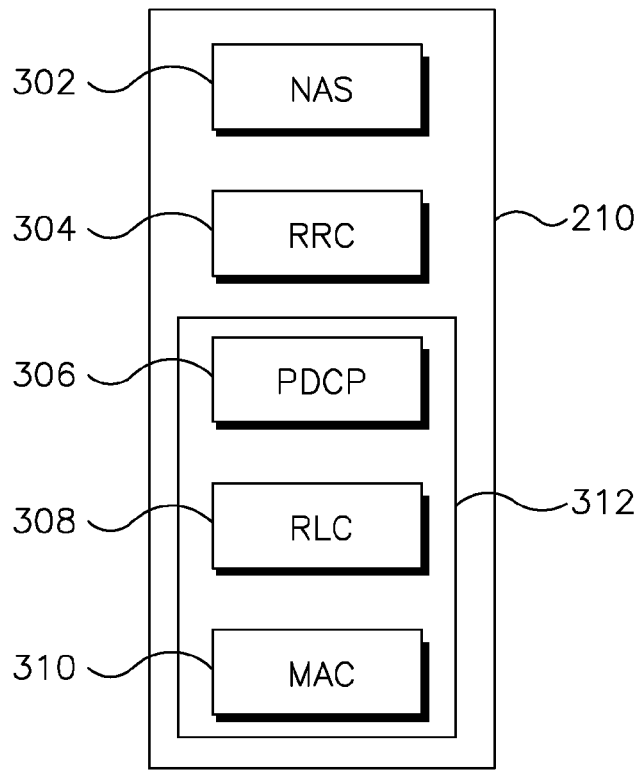
FIG. 3 shows an LTE control-plane protocol stack in accordance with the prior art.
Figure 5:
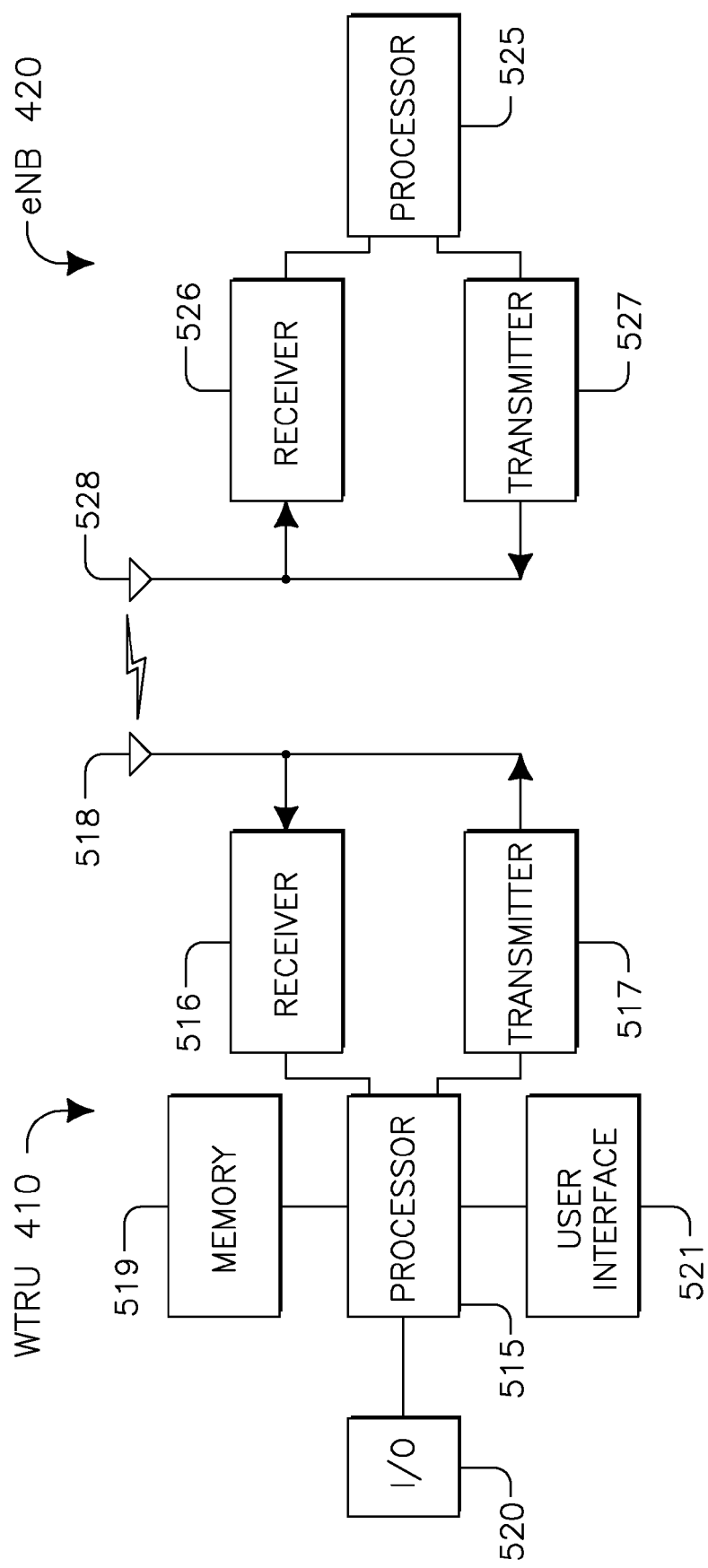
FIG. 5 is a block diagram of a WTRU and the eNB of FIG. 4.

FIG. 5 is a functional block diagram 500 of a WTRU 410 and the eNB 420 of the wireless communication system 400 of FIG. 4. As shown in FIG. 4, the WTRU 410 is in communication with the eNB 420. The WTRU 410 is configured with both a user plane protocol stack (100 of FIG. 1) and control plane protocol stack (200 of FIG. 2). Each component in a stack is configured to communicate with components above and below it in the stack. Furthermore, each component in a stack is configured to communicate with its peer component in a peer protocol stack.

In addition to the components that may be found in a typical WTRU, the WTRU 410 includes a processor 515, a receiver 516, a transmitter 517, and an antenna 518. The WTRU 410 may also include a user interface 518, which may include, but is not limited to, an LCD or LED screen, a touch screen, a keyboard, a stylus, or any other typical input/output device. The WTRU 410 may also include memory 519, both volatile and non-volatile as well as interfaces 520 to other WTRU's, such as USB ports, serial ports and the like. The receiver 516 and the transmitter 517 are in communication with the processor 515. The antenna 518 is in communication with both the receiver 516 and the transmitter 517 to facilitate the transmission and reception of wireless data.

In addition to the components that may be found in a typical eNB, the eNB 420 includes a processor 525, a receiver 526, a transmitter 527, and an antenna 528. The receiver 526 and the transmitter 527 are in communication with the processor 525. The antenna 528 is in communication with both the receiver 526 and the transmitter 527 to facilitate the transmission and reception of wireless data.

A WTRU and an eNB may operate in acknowledge mode (AM) or unacknowledged mode (UM). When operating in AM, a transmitting entity may receive an acknowledgment if a data packet, such as a PDU or an SDU, is successfully transmitted to a receiving entity. For example, an RLC entity may generate a data packet and the packet may be transmitted. The receiving RLC entity may receive the packet and may generate an RLC status report that may be transmitted back to the transmitting RLC entity. The RLC status report may include an indication to show if transmission of the packet was successful. For example, if a WTRU transmits a set of RLC PDUs, and all the transmitted RLC PDUs were acknowledged by the receiving entity in an RLC status report, then delivery may be deemed successful. However, if one of the RLC PDUs was negatively acknowledged, and the packet was not retransmitted or is discarded, then the transmitting entity may receive an RLC status report that includes an indication of unsuccessful delivery.

Another indication that the RLC PDU was not successfully delivered may be provided to the transmitting RLC entity without a status report. For example, if the RLC entity has been reset or reestablished and at least one RLC packet has been negatively acknowledged or has not been positively acknowledged by the receiving RLC, the transmitting RLC may determine that delivery was not successful.

A PDCP may send a packet to an RLC. The RLC may transmit the packet and send an RLC delivery confirmation to the PDCP. If the PDCP originally received the packet from an upper layer, such as an RRC for example, the PDCP may provide a delivery indicator to the upper layer. An indication of successful delivery of the PDCP packet may be an indicator provided by the RLC entity. The PDCP may provide the indicator to the upper layer, such as the RRC, for example, if it receives an indication of success from the lower layer, such as the RLC, for example. The PDCP may transmit an indication of unsuccessful delivery if the PDCP receives a failure notification from the lower layer. Furthermore, an indication of delivery failure may be provided to the RRC from the PDCP, if the PDCP discards the packet prior to submitting it to the RLC layer.

The PDCP status report function may be used to determine the status of the delivery of a PDCP packet. An SRB that supports NAS messages may also support the exchange of PDCP status reports. The SRB may be used to convey information on missing or acknowledged PDCP packets.

In a handover, the PDCP status report may be used to determine the status of the delivery of a PDCP SDU. Each PDCP SDU has an associated sequence number. The PDCP sequence number (SN) associated with the first SDU to be transmitted to the target cell after handover may be continued from the SN of the last SDU delivered to the source cell before handover. In other words, the SNs are continued from the source to the target, rather than starting with a new SN in the target cell. The SRB uplink (UL) and/or downlink (DL) PDCP sequence number (SN) context can be exchanged between the source and the target eNB. The PDCP SN may also be retained in the WTRU. Alternatively, a WTRU or eNB may create the PDCP status report using the pre-handover SN. As another alternative, the PDCP status report may be exchanged in the source eNB.

PDCP status reports for SRBs provide delivery confirmation to upper layers, such as an RRC and NAS, for example. The upper layer will then take the appropriate action, based on the status report.

Figure 6A:
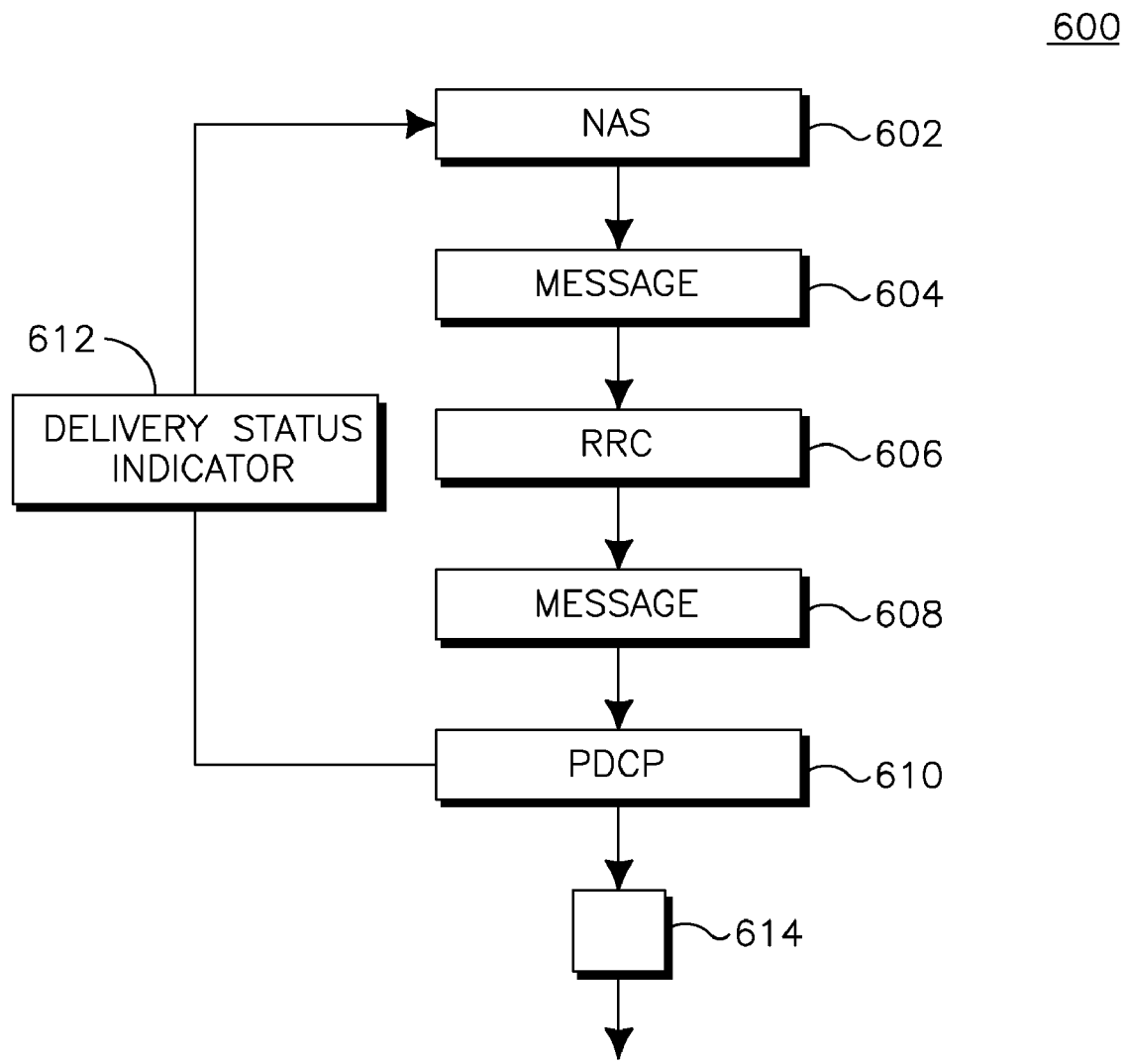
FIG. 6A is a block diagram of an RRC level acknowledgement method in accordance with one embodiment.

The RRC may also provide a delivery notification service to upper layers. FIG. 6A is a block diagram of an RRC level acknowledgement method 600 in accordance with one embodiment. The NAS 602 passes a message 604 to the RRC 606. The RRC 606 processes the message 604 and passes an RRC message 608 to the PDCP 610. The PDCP 610 passes a PDCP SDU 614 to lower layers for transmission. The PDCP 610 may pass a delivery status indicator 612 to the NAS 602 that includes an indication if the delivery of the PDCP SDU 614 was successful or unsuccessful. The indicator 612 may show a successful delivery if the PDCP 610 receives an indication that delivery of the PDCP SDU 614 was successful. However, if the PDCP 610 does not receive an acknowledgement (ACK) or receives a non-acknowledgement (NACK), the PDCP 610 may determine that delivery of the PDCP SDU 614 was not successful, and the delivery status indicator 612 will indicate an unsuccessful delivery.

Figure 6B:
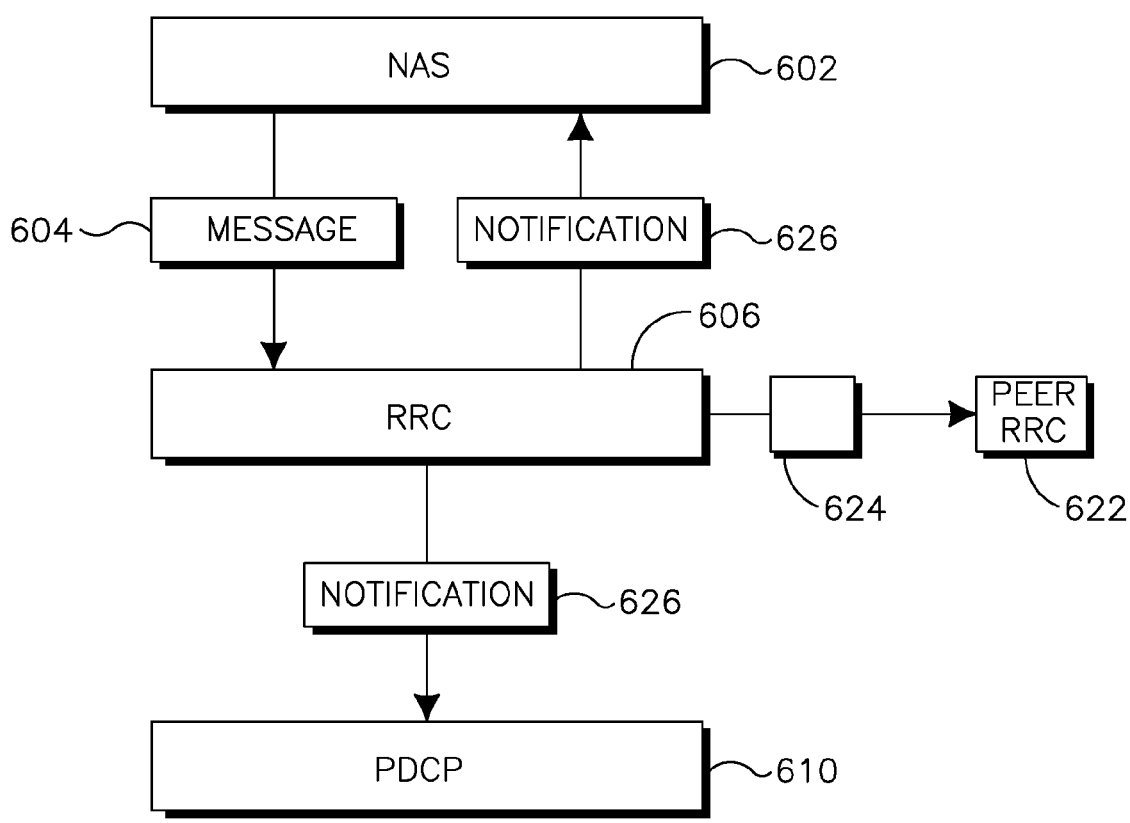
FIG. 6B is a block diagram of an RRC level acknowledgement method in accordance with an alternative embodiment.

FIG. 6B is a block diagram of an RRC level acknowledgement method 620 in accordance with another embodiment. In FIG. 6A, the RRC 606 relies on the PDCP 608 to provide delivery notification to the NAS 602. As shown in FIG. 6B, the RRC 606 may also directly provide delivery notification to the NAS 602. Similar to FIG. 6A, in FIG. 6B the NAS 602 passes a message 604 to the RRC 606. However, unlike in FIG. 6A, in FIG. 6B the RRC 606 sends a message 624 directly to a peer RRC 622. If the RRC 606 does not receive an RLC Layer 2 (L2) ACK (not shown) for the direct transfer message 624, the RRC 606 may send a delivery notification 626 directly to the NAS 602 that indicates a failed delivery. In response to the delivery notification 626, the NAS 602 may stop all timers and retransmit the message 604. The RRC 606 may also provide the delivery notification 626 to the NAS 602 if the RRC 606 receives an indication to retransmit the NAS message in a handover command or through additional signaling in the source or target cell.

Upon receiving a handover command or upon executing a handover or cell selection or reselection, the RRC 606 may provide a delivery notification 626 to the upper layer, for example, the NAS 602 or to lower layers, for example, the PDCP 610. The notification may include a notice that the RRC 606 received the handover command, or executed a handover, cell selection or cell reselection. The RRC 606 may also provide a notification of another event that may trigger a NAS 602 retransmission or delivery notification to the NAS 602 or the PDCP 610.

Figure 6C:
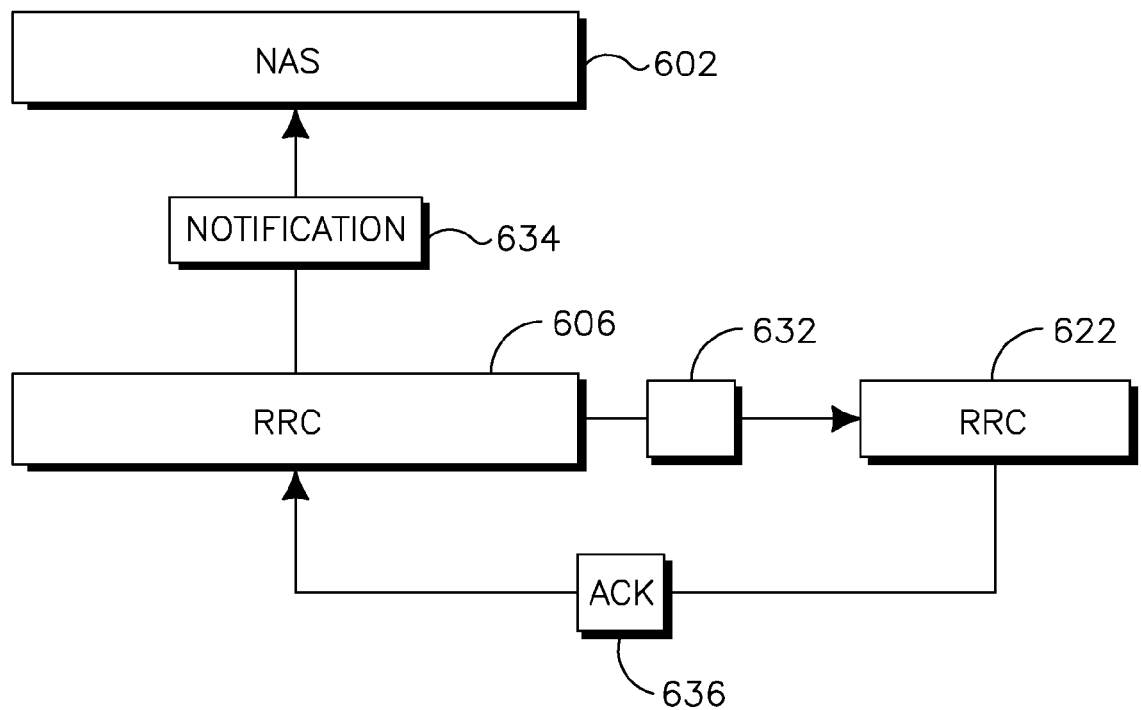
FIG. 6C is a block diagram of an RRC level acknowledgement method in accordance with another embodiment.

FIG. 6C is a block diagram of an RRC level acknowledgement method 630 in accordance with an alternative embodiment. The RRC 606 sets a bit in a header of an RRC message 632 to request an RRC level acknowledgement from a peer RRC entity 622. The peer RRC entity 622 then sends an RRC level acknowledgment 636. If no acknowledgment is received within a certain time, a delivery notification of failed transmission 634 is provided to the NAS 602 at handover. A lack of acknowledgement from the peer RRC entity 622 may also be used to trigger RRC level retransmission.

The RRC acknowledgment 636 from the RRC peer entity 622 may be for single or multiple RRC messages. The RRC 606 may request that the peer RRC 622 send the acknowledgement 636 by setting a bit in an RRC header or the acknowledgment 636 may be required by definition or default. The RRC acknowledgment 636 may indicate which instance of a particular RRC message is being acknowledged.

A delivery confirmation to an upper layer may be triggered by a lower layer upon a final determination of whether the SDU has been successfully delivered or of a transmission failure. A timer may be used to delay the delivery confirmation. For example, a delivery confirmation prohibit timer may be running. The delivery confirmation may not occur while the timer is running. However, if a trigger occurs and the timer has expired, the delivery confirmation may be passed on to the higher layer.

A delivery confirmation to an upper layer may also be triggered by lower layer upon a mobility event, such as a handover, a reset or a reestablishment event, for example. Further, the delivery confirmation may be triggered upon a request from an upper layer.

Figure 7:
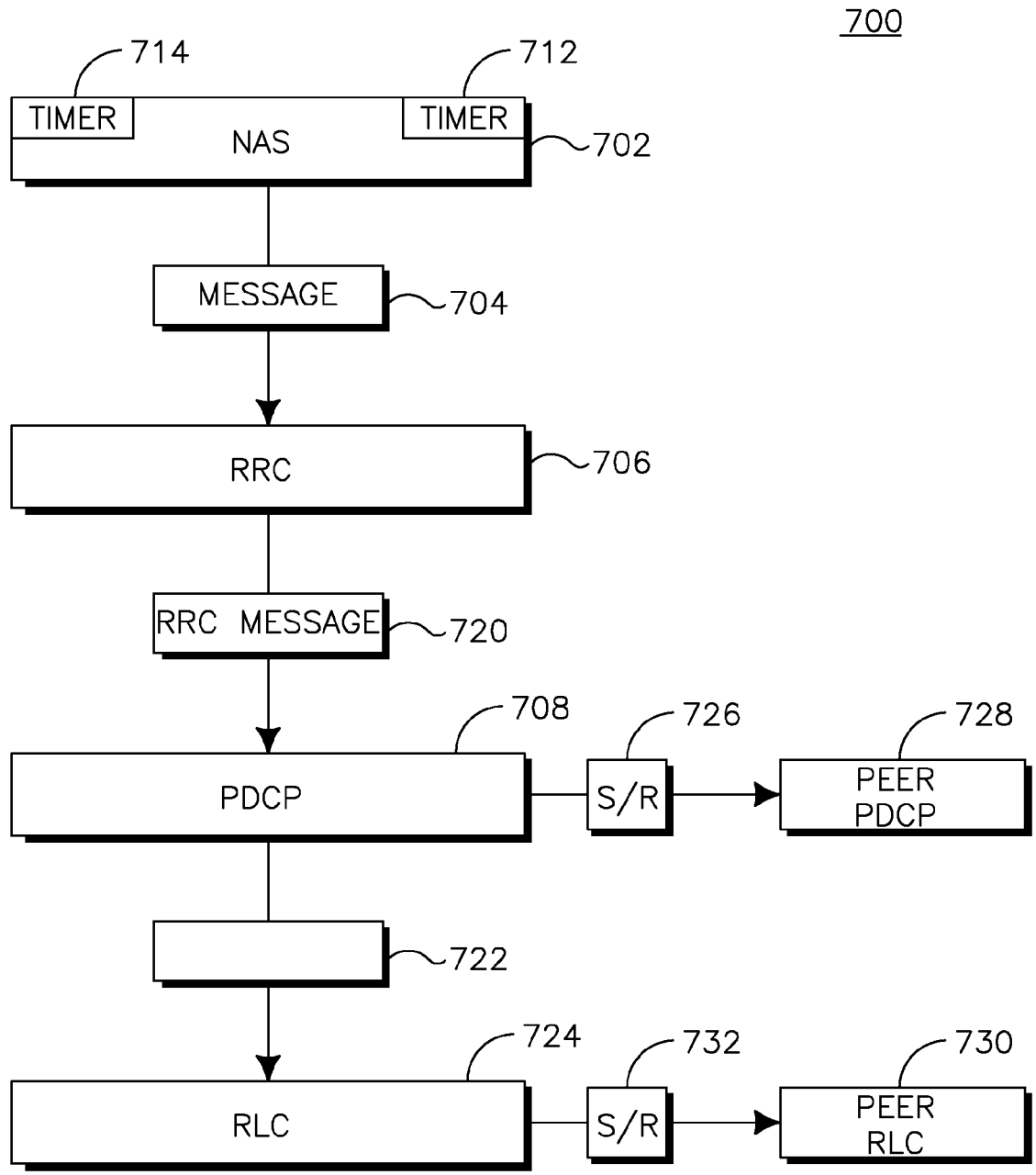
FIG. 7 is a block diagram of a method of direct notification of delivery in accordance with one embodiment.

FIG. 7 is a block diagram of a method of direct notification of delivery 700 in accordance with one embodiment. The NAS 702 may send a message 704 to the RRC 706. Upon sending the message 704, the NAS 702 may indicate to the RRC 706 if the NAS 702 wants a delivery confirmation. The NAS 702 may, based on notifications received from the RRC 706 and/or the PDCP 708, immediately retransmit the message 704, stop a timer 712 that started when the message 704 was sent originally, or decrease or increase timer 712. Upon retransmission of the message 704, the NAS 702 may start a new timer 714.

Upon receiving the NAS message 704 from the NAS 702, the RRC 706 examines the message 704, which may include a delivery status request indicator (not shown) to determine if a delivery confirmation is required for the message 704. If a delivery confirmation is required, the RRC 706 submits an RRC message 720 that includes the NAS message 704, to the PDCP 708 that optionally includes a delivery confirmation request.

The PDCP 708 receives the RRC message 720 that may include the delivery confirmation request and determines if a delivery confirmation is required for the message 720. If delivery confirmation is required, the PDCP 708 submits a message 722 to the RLC 724. The PDCP 708 indicates, with the message 722, if the PDCP 708 requires a delivery confirmation. The PDCP 708 sends message 722 to the RLC 724, and if a handover command is received, the PDCP 708 may also exchange PDCP status reports 726 with a peer PDCP 728 that pertain to the SRBs for handover. The PDCP 708 may also exchange PDCP status reports 726 with the peer PDCP 728 if there is a cell selection or reselection. Alternatively, if message 722 is sent, a new polling bit may be set in the PDCP header of the message 722. The polling bit will solicit the peer PDCP entity 728 to generate a PDCP status report 726.

The RLC 724 receives the message 722 from the PDCP 708 and determines if the message 722 includes a requirement for delivery confirmation. If the message 722 includes a delivery confirmation request, the RLC 724 will set the RLC status report polling bit in the RLC header of the message. The RLC status report polling bit will indicate to the peer RLC entity 730 that a status report 732 should be generated.

Figure 8:
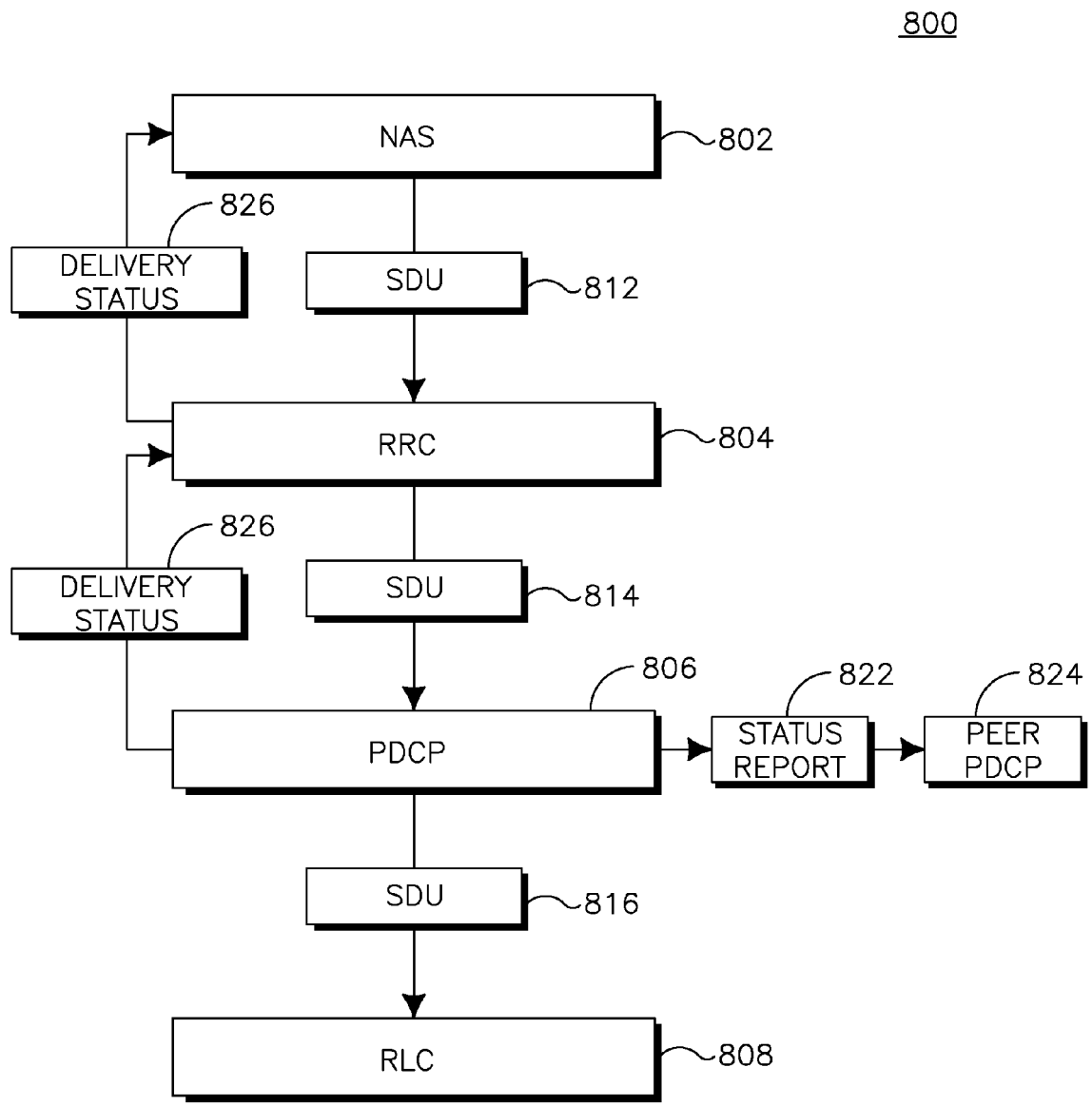
FIG. 8 is a block diagram of a notification method 800 in accordance with one embodiment.

FIG. 8 is a block diagram of a notification method 800 in accordance with one embodiment. The NAS 802 sends an RRC SDU 812 to the RRC 804. The RRC SDU 812 includes a delivery confirmation request. The RRC 804 processes the RRC SDU 812 and sends a PDCP SDU 814 to the PDCP 806. The PDCP SDU 814 includes a delivery confirmation request. The PDCP 806 processes the PDCP SDU 814 and sends an RLC SDU 816 to the RLC 808. When a handover occurs, the PDCP 806 will send and receive PDCP status reports 822 to and from a peer PDCP 824 in a target cell. The delivery status of the PDCP SDU 814 is included in the PDCP status report 822. The PDCP 806 sends a delivery status report 826 to the RRC 804. The RRC 804 then forwards the delivery status report 826 to the NAS 802.

Figure 9:
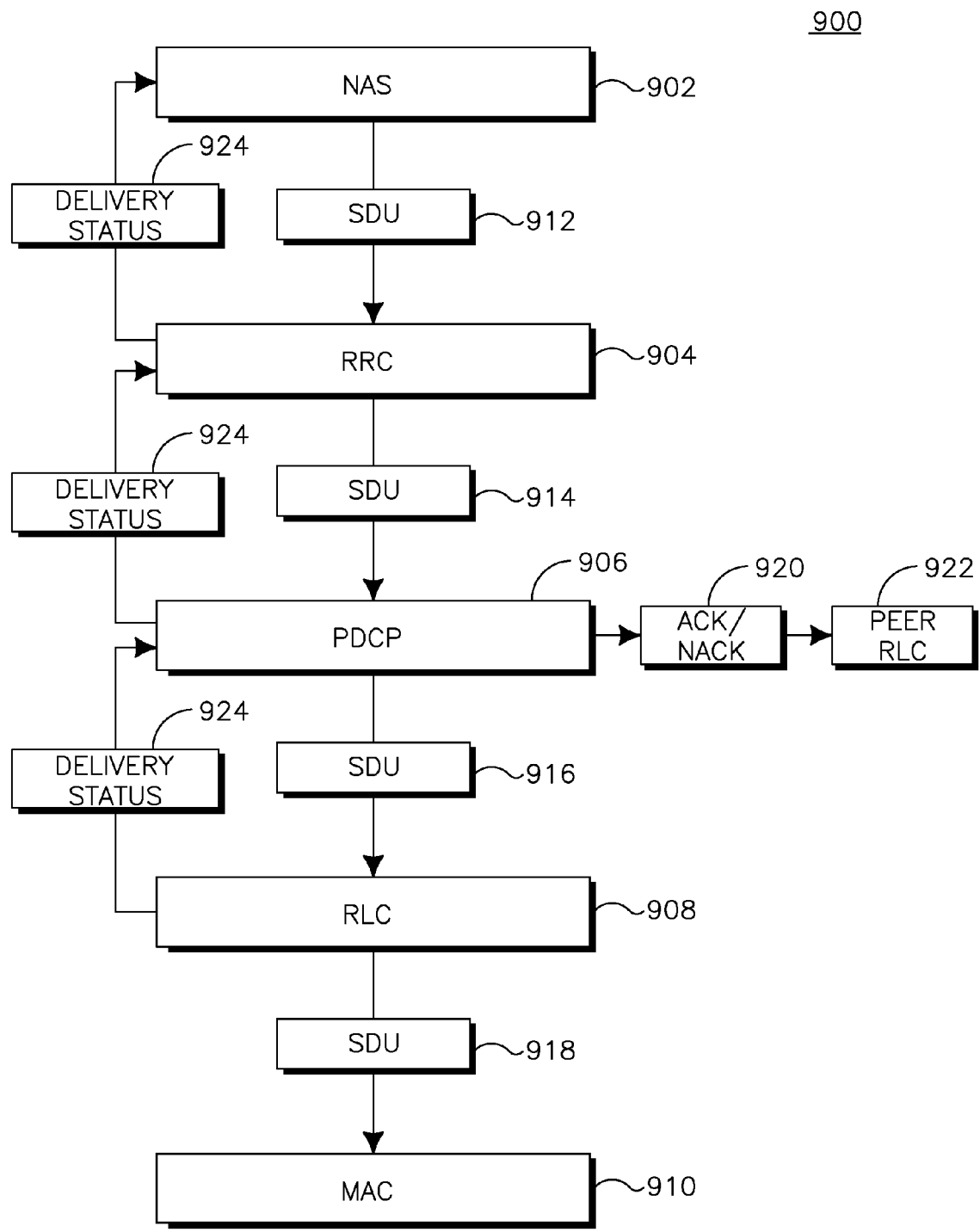
FIG. 9 is a block diagram of a notification method 900 in accordance with another embodiment.

FIG. 9 is a block diagram of a notification method 900 in accordance with another embodiment. In FIG. 9, the NAS 902 submits an RRC SDU 912 to the RRC 904. The RRC SDU 912 includes a delivery confirmation request. The RRC 904 processes the RRC SDU 912 and creates and submits a PDCP SDU 914 to the PDCP 906. The PDCP SDU 914 may include a delivery confirmation request. The PDCP 906 processes the PDCP SDU 914 and creates and submits an RLC SDU 916 to the RLC 906. The RLC 908 processes the RLC SDU 916 and creates and submits at least one MAC SDU 918 to the MAC 910. The RLC 908, while functioning in AM mode, may receive an ACK/NACK 920 from a peer RLC entity 922. The RLC 908 then provides a delivery status report 924 to the PDCP 906 based on the latest RLC delivery status, which is derived from the ACK/NACK 920. The PDCP 906 provides the delivery status report 924 to the RRC 904. The RRC 904 provides the delivery status report 924 to the NAS 902.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method of data delivery notification in a wireless transmit/receive unit (WTRU), the method comprising:
   transmitting an uplink (UL) message;
   starting a timer in response to transmitting the UL message;
   performing a mobility operation prior to expiration of the timer;
   wherein an indication of delivery failure is sent to a radio resource control (RRC) layer by a lower layer in response to a status report associated with the timer; and
   communicating, by the RRC layer, a delivery failure message to the non-access stratum (NAS) in response to performing the mobility operation even when the indication of the delivery failure is not sent to the RRC.

2. The method as in claim 1 wherein the mobility operation is a handover.

3. The method as in claim 1 wherein the mobility operation is a RRC connection reestablishment.

4. The method as in claim 1 wherein the generation of the delivery failure message is based on an event between peer components on a protocol stack.

5. The method as in claim 4 wherein the event is the reception of a status report, an acknowledgement, a negative acknowledgement or an expiration of a timer.

6. A wireless transmit/receive unit (WTRU) comprising:
   a processor configured to:
   transmit an uplink (UL) message;
   start a timer in response to transmitting the UL message;
   perform a mobility operation prior to expiration of the timer; wherein an indication of delivery failure is sent to a radio resource control (RRC) layer by a lower layer in response to a status report associated with the timer; and
   communicate, by the RRC layer, a delivery failure message to the non-access stratum (NAS) in response to performing the mobility operation even when the indication of the delivery failure is not sent to the RRC.

7. The WTRU as in claim 6 wherein the mobility operation is a handover.

8. The WTRU as in claim 6 wherein the mobility operation is a RRC connection reestablishment.

9. The WTRU as in claim 6 wherein the generation of the delivery failure message is based on an event between peer components on a protocol stack.

10. The WTRU as in claim 9 wherein the event is the reception of a status report, an acknowledgement, a negative acknowledgement or an expiration of a timer.

* * * * *